(12) United States Patent
Maeda

(10) Patent No.: US 8,948,618 B2
(45) Date of Patent: Feb. 3, 2015

(54) JAM DETECTION AND REMOVAL IN AN IMAGE FORMING APPARATUS SYSTEM

(71) Applicant: Canon Kabushiki Kaisha, Tokyo (JP)

(72) Inventor: Yuuki Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/841,554

(22) Filed: Mar. 15, 2013

(65) Prior Publication Data

US 2013/0258391 A1    Oct. 3, 2013

(30) Foreign Application Priority Data

Mar. 30, 2012    (JP) .................................. 2012-078766

(51) Int. Cl.
| | |
|---|---|
| B41J 11/00 | (2006.01) |
| H04N 1/32 | (2006.01) |
| G06K 15/22 | (2006.01) |
| G06K 15/00 | (2006.01) |
| H04N 1/00 | (2006.01) |
| G06F 3/12 | (2006.01) |

(52) U.S. Cl.
CPC ................................ G06K 15/4085 (2013.01)
USPC ........................................... 399/21; 399/407

(58) Field of Classification Search
CPC .. G06F 3/121; H04N 1/00567; H04N 1/3263; B41J 11/006; G06K 15/4085
USPC .................... 358/1.14; 399/21, 407
See application file for complete search history.

(56) References Cited

U.S. PATENT DOCUMENTS

2007/0127070 A1*   6/2007   Murakami ................... 358/1.16

FOREIGN PATENT DOCUMENTS

| JP | 2006-011986 A | 1/2006 |
|---|---|---|
| JP | 2007-207272 A | 8/2007 |
| JP | 2007-220082 A | 8/2007 |

* cited by examiner

Primary Examiner — Eric A Rust
(74) Attorney, Agent, or Firm — Canon U.S.A., Inc. IP Division

(57) ABSTRACT

A print system is provided which can execute, in a case that a jam occurs in a sheet processing apparatus, recovery processing of a job in which the jam occurred without wasting a sheet that has been already used in a subsequent job.

17 Claims, 9 Drawing Sheets

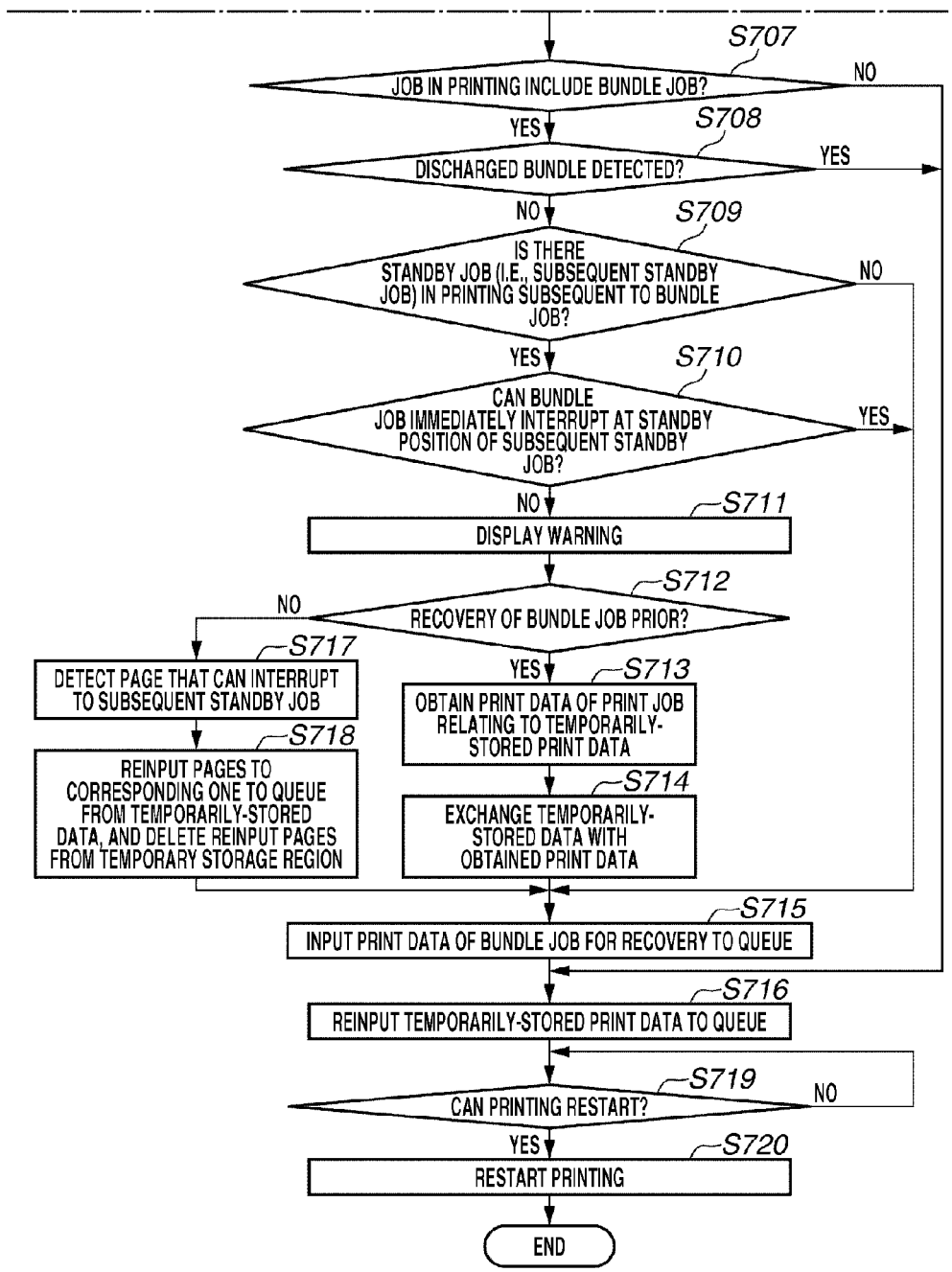

JAM DETECTION AND REMOVAL IN AN IMAGE FORMING APPARATUS SYSTEM

BACKGROUND OF THE INVENTION

1. Field of the Invention

The present invention relates to a print system, a control method of the print system, and a storage medium.

2. Description of the Related Art

A print system such as a print on demand (POD) type system that can perform printing in high productivity and high efficiency includes a large-scaled print apparatus, and various sheet processing apparatuses are further connected thereto. Some types of sheet processing take a long time to be performed in the sheet processing apparatuses, thus a technique for improving the productivity is applied to some of the sheet processing apparatuses. For example, there is a technique for controlling an operation such that if it is determined that a subsequent job can be printed in parallel with sheet processing of a preceding job which is currently performed, printing of the subsequent job is started to improve the total productivity (refer to Japanese Patent Application Laid-Open No. 2007-220082).

Further for example, there is a technique for enabling a sheet processing apparatus to immediately reprint a necessary print job if a jam occurs in the sheet processing apparatus when a job for performing sheet processing using a preprint sheet on which data is printed in advance is executed (refer to Japanese Patent Applications Laid-Open No. 2006-011986 and No. 2007-207272).

As described above, various sheet processing apparatuses are included in the print system for the POD and have been developed by a plurality of manufacturers. In addition, measures which can connect, to a print apparatus, the sheet processing apparatus developed by the plurality of manufacturers as easy as possible have been discussed. For example, there is a measure which can establish a connection between a third-party sheet processing apparatus developed by the plurality of manufacturers and a print apparatus without a specific setting by communicating only a status therebetween using a simple interface (I/F). In this connection form, the print system including the print apparatus does not need to consider the capacity of the third-party sheet processing apparatus, and a specific output destination is assigned only to a conveyance port to the sheet processing apparatus. The sheet processing apparatus executes the sheet processing of a sheet received from the conveyance port according to an instruction set in the sheet processing apparatus.

In other words, on the print apparatus side, after conveying a sheet to the output destination to which the third-party sheet processing apparatus is connected, the control of the sheet is not required anymore and the print apparatus can shift the control to a next print job. More specifically, the measure provides a configuration which can eliminate the control specific to the sheet processing apparatus while simplifying the I/F between the sheet processing apparatus and the print apparatus, so that high productivity can be realized while enabling easy inline connection between various types of sheet processing.

However, the technique discussed in Japanese Patent Application Laid-Open No. 2007-220082 does not consider a case when a jam occurs in a job of which sheet processing is being executed in the sheet processing apparatus, and thus an operation is not always realized as users would expect. For example, when printing of a subsequent job is started during execution of a sheet processing job and a jam then occurs in the sheet processing apparatus, recovery of the sheet processing job is necessary. However, recovery processing cannot be immediately performed because the printing of the subsequent job has been started. According to the techniques discussed in Japanese Patent Applications Laid-Open No. 2006-011986 and No. 2007-207272, if a jam occurs in the sheet processing apparatus, a print job necessary to be reprinted is input to a close print apparatus. Thus, recovery processing can be immediately realized. However, the techniques do not consider a case that the print apparatus is printing another job. Therefore, if the print apparatus performs printing of another job, it may take a longer time to prepare for print data for recovery. There is a possibility that the operation is not performed as users would expect.

On the other hand, in a print system to which the third-party sheet processing apparatus is connected, a method for enabling immediate recovery in a case where a jam occurs in the sheet processing apparatus is adopted. In the print system like this, when a jam is detected in the sheet processing apparatus, all jobs during printing are deleted in the print apparatus, and after inputting a job for executing the sheet processing for recovery, the jobs previously deleted in the print apparatus are re-input.

By adopting such a method, the recovery of the job for executing the sheet processing can be performed without fails. In addition, a subsequent job can be certainly printed. However, according to the method, in a case where a job is stopped in the middle of printing in the print apparatus, if the job in the print apparatus is simply deleted and another job is re-input, the same portion may be output redundantly, and a sheet may be used unnecessarily.

SUMMARY OF THE INVENTION

The present invention is directed to a solution of the above-described issue.

According to the present invention, a print system includes a print apparatus configured to execute print processing and a sheet processing apparatus configured to execute sheet processing of a sheet to which the print processing is executed. The print system further includes a detection unit configured to detect that a jam occurs in the sheet processing apparatus during execution of the sheet processing based on a first job, a control unit configured to execute a recovery job corresponding to the first job in a case that the detection unit detects that the jam occurs in the sheet processing apparatus, and a determination unit configured to determine whether a second job which is a job subsequent to the first job is being executed in a case that the detection unit detects that the jam occurs in the sheet processing apparatus, wherein, in a case that the determination unit determines that the second job is being executed, the control unit controls a job execution order to execute the recovery job next to the second job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.
[Description of System Configuration of Entire Print Environment 10000 Including Print System 1000]

According to a first exemplary embodiment of the present invention, in order to solve the problem described in the related art, a print environment different from an office environment such as a print on demand (POD) environment is assumed. A description is given of the entire system environment of a site (print environment 10000 in FIG. 1) under the POD environment including a print system 1000. The print environment 10000 is one of features according to the first exemplary embodiment.

According to the present exemplary embodiment, the print environment 10000 to which the print system 1000 can be applied is suitable to the POD environment. Therefore, the print environment 10000 is also referred to as a POD system 10000.

Figure 1:
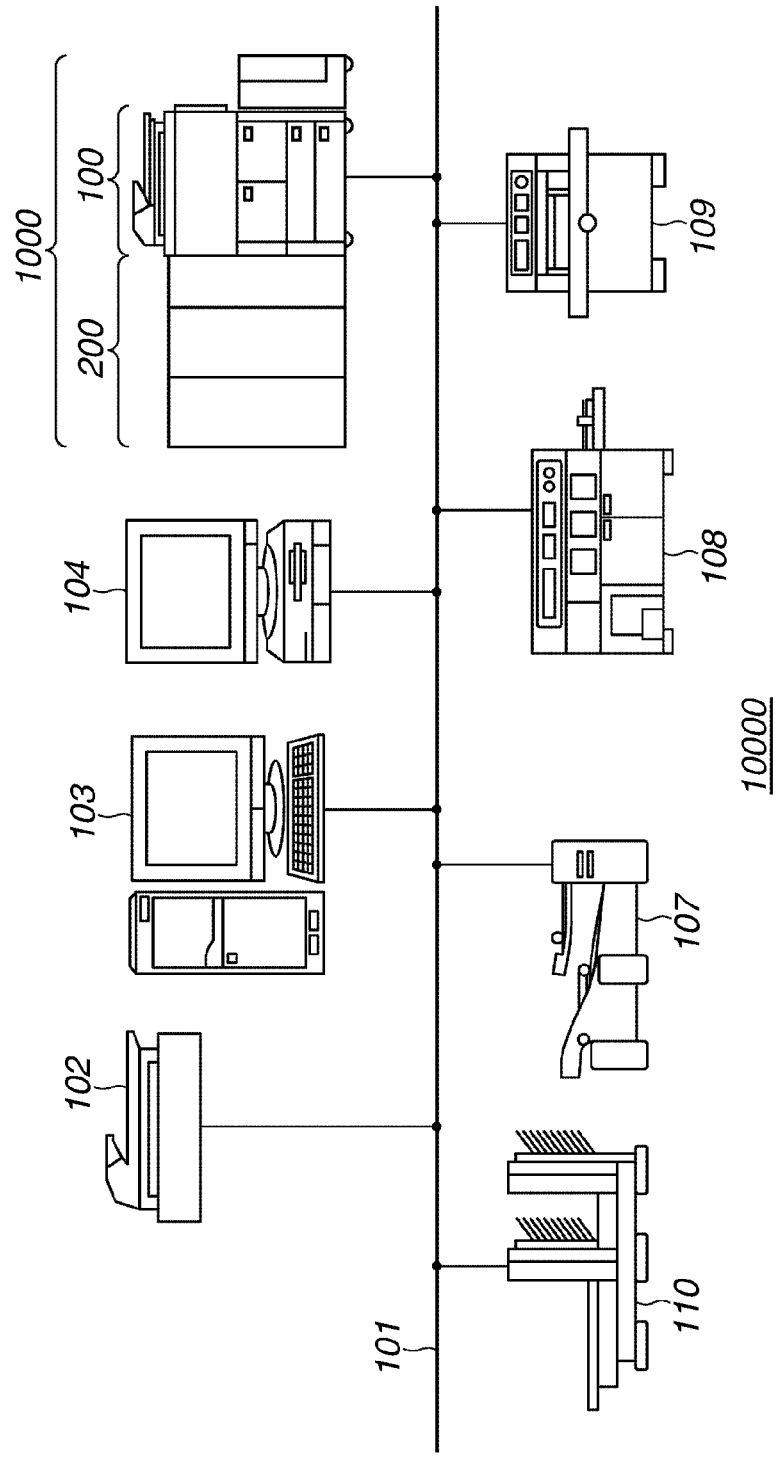
FIG. 1 illustrates a configuration of a print system according to a first exemplary embodiment of the present invention.

FIG. 1 illustrates a configuration of the print system 1000 according to the present exemplary embodiment. Referring to FIG. 1, the POD system 10000 in FIG. 1 includes, as its components, the print system 1000 according to the present exemplary embodiment, a server 103, and a client 104. The server 103 and the client 104 may be computers such as personal computers (PCs). Further, the POD system 10000 in FIG. 1 includes a paper folding machine 107, a cutting machine 109, a saddle stitch bookbinding machine 110, a case bookbinding machine 108, a scanner 102, and the like. A plurality of devices as described above is provided for the POD system 10000.

The print system 1000 includes, as its components, a print apparatus 100 and a sheet processing apparatus 200. As an example of the print apparatus 100, a multifunction peripheral (MFP) having a plurality of functions, such as a copy function and a print function, is described in the present exemplary embodiment. Alternatively, the print apparatus 100 can be a single-function type print apparatus with only the copy function or the print function.

The paper folding machine 107, the case bookbinding machine 108, the cutting machine 109, and the saddle stitch bookbinding machine 110 illustrated in FIG. 1 are defined as sheet processing apparatuses, similarly to the sheet processing apparatus 200 provided for the print system 1000. More specifically, these sheet processing apparatuses are devices that can execute sheet processing of a job sheet printed by the print apparatus 100 provided for the print system 1000. The paper folding machine 107 is configured to, for example, execute folding processing of the job sheet printed by the print apparatus 100. The cutting machine 109 is configured to execute cutting processing of the sheet printed by the print apparatus 100 on a unit of a sheet bundle including a plurality of sheets. The saddle stitch bookbinding machine 110 is configured to execute saddle stitching bookbinding processing of the job sheet printed by the print apparatus 100. The case bookbinding machine 108 is configured to execute case bookbinding processing of the job sheet printed by the print apparatus 100.

In order to execute various types of sheet processing by these sheet processing apparatuses, an operator needs to perform operations to extract a printed matter of a job printed by the print apparatus 100 from a sheet discharge unit in the print apparatus 100, and to set the printed matter to the sheet processing apparatus which executes target processing. As described above, in a case where the sheet processing apparatus other than the sheet processing apparatus 200 provided for the print system 1000 is used, an intervention operation by an operator is required after the print processing of the print apparatus 100. In other words, when the sheet processing necessary for the job printed by the print apparatus 100 is executed by the sheet processing apparatus 200 provided for the print system 1000, the intervention operation by the operator is not required after executing the print processing of the print apparatus 100. This is because, the print system 1000 is configured to supply a sheet subjected to printing by the print apparatus 100 directly from the print apparatus 100 to the sheet processing apparatus 200.

More specifically, a sheet conveyance path in the print apparatus 100 can be connected to a sheet conveyance path in the sheet processing apparatus 200. As described above, there is a physical connection relationship between the sheet processing apparatus 200 and the print apparatus 100 provided for the print system 1000. Further, the print apparatus 100 and the sheet processing apparatus 200 include a central processing unit (CPU) respectively and are configured to establish data communication therebetween. More specifically, there is an electrical connection relationship between the print apparatus 100 and the sheet processing apparatus 200.

According to the present exemplary embodiment, a control unit provided for the print system 1000 comprehensively controls the print apparatus 100 and the sheet processing apparatus 200. As an example, a CPU 205A in the print apparatus 100 illustrated in FIG. 2 performs comprehensive control. The print apparatus 100 prints print data of a job as a processing target of which printing execution is requested and which is transmitted via a network 101 from, for example, a personal computer (PC) corresponding to an example of an external device such as the client 104 or the server 103.
[Internal Configuration (Software Configuration) of Print System 1000]

Figure 2:
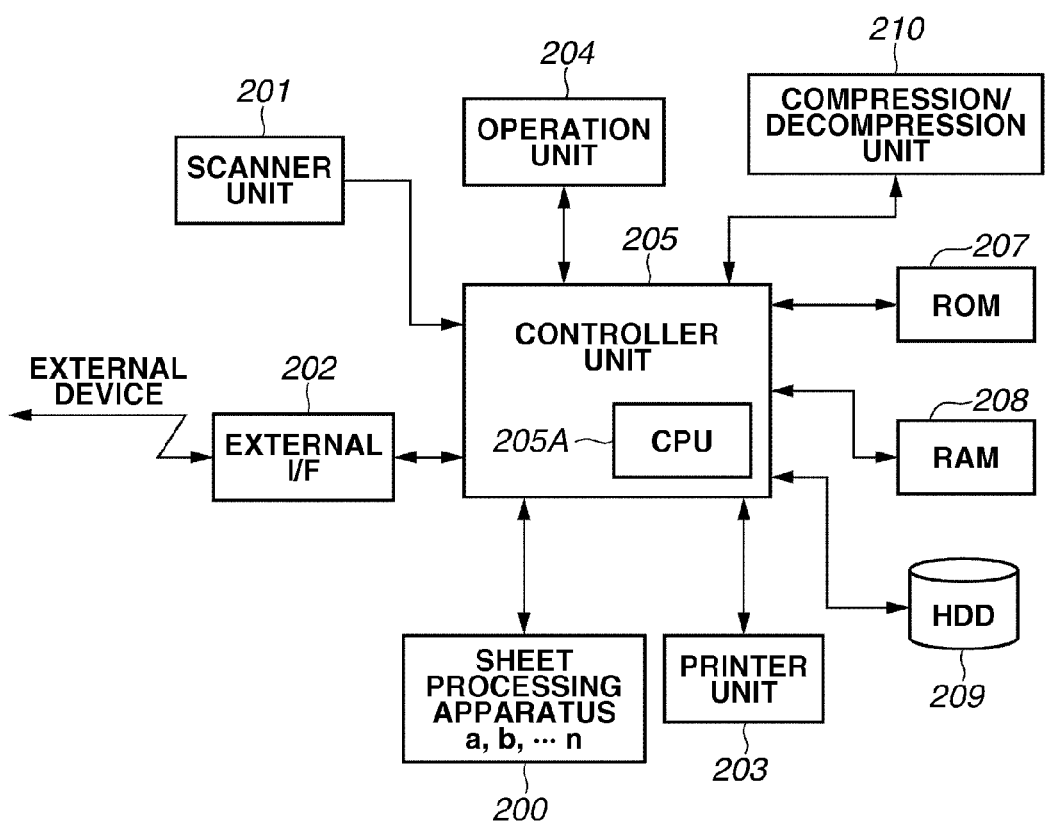
FIG. 2 illustrates a block diagram of the configuration of the print system in FIG. 1 according to the first exemplary embodiment.

An internal configuration (mainly, a software configuration) of the print system 1000 is described with reference to FIG. 2. FIG. 2 is a block diagram illustrating the configuration of the print system in FIG. 1. According to the present exemplary embodiment, the print system 1000 is described as an example which includes the print apparatus 100 that can receive a plurality of print jobs and a plurality of sheet processing apparatuses with different functions for executing sheet post-processing which are connected to the print apparatus 100, and performs post-processing on a sheet or a sheet bundle discharged therefrom. In addition, according to the present exemplary embodiment, a plurality of print jobs can be continuously processed, and a bundle job for processing a sheet bundle and a stack job for stacking sheets can be continuously executed. As described with reference to flowcharts below, a gluing bookbinding machine, a large-capacity stacker, and a saddle-stitching bookbinding machine which are inline-connected to the print apparatus 100 respectively include sensors that detect a jam of a conveyed sheet or a sheet bundle. In such print system 1000, if a jam is detected during preceding job processing such as trimming of the sheet bundle and a subsequent print job includes processing for stacking sheets to the large-capacity stacker, the subsequent print job is interrupted by the jam of the sheet bundle. According to the present exemplary embodiment, in a situation in which the subsequent print job is in progress by re-inputting a print job for processing the interrupted sheet bundle, a timing for inserting the print job for processing the sheet bundle is controlled so as not to abandon all sheets as described below.

In this example, all units illustrated in FIG. 2 provided for the print system 1000 are arranged within the print apparatus 100, except for the sheet processing apparatus 200 (strictly, a series of sheet processing apparatuses configured with a plurality of inline-type sheet processing apparatuses). In other words, the sheet processing apparatus 200 is attachable/detachable to/from the print apparatus 100, and can be provided as an option for the print apparatus 100. Consequently, an effect of providing the number of inline finishers required for the POD environment can be produced. Therefore, the print apparatus 100 has the configuration as described below.

Referring to FIG. 2, the print apparatus 100 includes a nonvolatile memory such as a hard disk 209 (hereinafter, also referred to as an HDD) that can store data of a plurality of jobs as processing targets in the print apparatus 100 itself. Further, the print apparatus 100 includes a copy function for printing job data received from a scanner unit 201 provided for the print apparatus 100 via the HDD 209 by a printer unit 203. In addition, the print apparatus 100 includes a print function for printing, by a printer unit 203 via the HDD 209, job data received from an external device such as the server 103 or the client 104 via an external I/F unit 202 which corresponds to an example of a communication unit. The print apparatus 100 is an MFP-type print apparatus (also referred to as an image forming apparatus) includes the plurality of functions. In other words, irrespective of a print apparatus which can perform color print or monochrome print, the print apparatus 100 may have any configuration as long as that can execute various types of control according to the present exemplary embodiment.

The print apparatus 100 according to the present exemplary embodiment includes the scanner unit 201 that reads a document image and performs image processing on the read image data. Further, the print apparatus 100 includes the external I/F unit 202 that receives and transmits image data from/to a facsimile machine, a network connection device, or an external dedicated device. Furthermore, the print apparatus 100 includes the HDD 209 that can store image data of a plurality of jobs as print targets received from one of the scanner unit 201 and the external I/F unit 202. In addition, the print apparatus 100 includes the printer unit 203 that executes print processing of data of a job as a print target stored in the HDD 209 to a print medium.

The print apparatus 100 also includes an operation unit 204 having a display unit which corresponds to an example of a user interface unit provided for the print system 1000. A display unit of an external device such as the server 103 or the client 104 and a keyboard or a mouse correspond to other examples of the user interface unit provided for the print system 1000.

The CPU (i.e., a control unit) 205A corresponding an example of a control unit provided for the print system 1000 comprehensively controls processing or operations of various units provided for the print system 1000. A read only memory (ROM) 207 stores various control programs necessary for the present exemplary embodiment including a program for executing various types of processing illustrated in flowcharts described below. The ROM 207 also includes a display control program for displaying various user interface (UI) screens (hereinafter, also referred to as UI screens) on the display unit of the operation unit 204.

The CPU 205A reads and executes a program in the ROM 207 to cause the print apparatus 100 to execute various operations according to the present exemplary embodiment. The ROM 207 stores a program for executing an operation to interpret page description language (PDL) data received from the server 103 or the client 104 via the external I/F 202 and render the PDL data to raster image data (bit map image data). These programs are processed by software.

The ROM 207 is a read only memory, and stores in advance various programs such as a program for a boot sequence, a program for font information, and the above-described programs. A random access memory (RAM) 208 is a readable and writable memory, and stores image data, various programs, and setting information transmitted via a memory controller from the scanner unit 201 or the external I/F 202.

The hard disk (HDD) 209 is a large-capacity storage device for storing image data compressed by a compression/decompression unit 210. The HDD 209 can store a plurality of data pieces such as print data of a processing target job. The CPU 205A performs control to enable the printer unit 203, via the HDD 209, to print data of the processing target job input from various input units such as the scanner unit 201 or the external I/F unit 202.

The CPU 205A stores the image data in an order of pages to be printed, and deletes the stored image data when detecting that the corresponding page is discharged outside of the print apparatus. Further, if the CPU 205A detects that all data pieces of the print job as the processing target are discharged outside of the print apparatus and the stored image data is entirely deleted, and the CPU 205A deletes the print job from the HDD 209.

The CPU 205A also performs control so as to transmit the print data pieces to an external device via the external I/F 202. As described above, the CPU 205A controls an operation for executing various output processing of data of the job as the processing target stored in the HDD 209, and deletes the data of the job as the processing target when the processing ends. The compression/decompression unit 210 compresses or decompresses image data stored in the RAM 208 or the HDD 209 with various compression methods such as Joint Bi-level Image Experts Group (JBIG) or Joint Photographic Experts Group (JPEG).

With the above-described configuration, the CPU 205A as an example of the control unit provided for the print system 1000 also controls the operation of the inline-type sheet processing apparatus 200 illustrated in FIG. 1. A mechanical configuration of the print system 1000 is described with reference to FIG. 3.

The configuration of the print system 1000 is described with reference to FIG. 3. The configuration is described with an operation when a copy job is executed.

Figure 3:
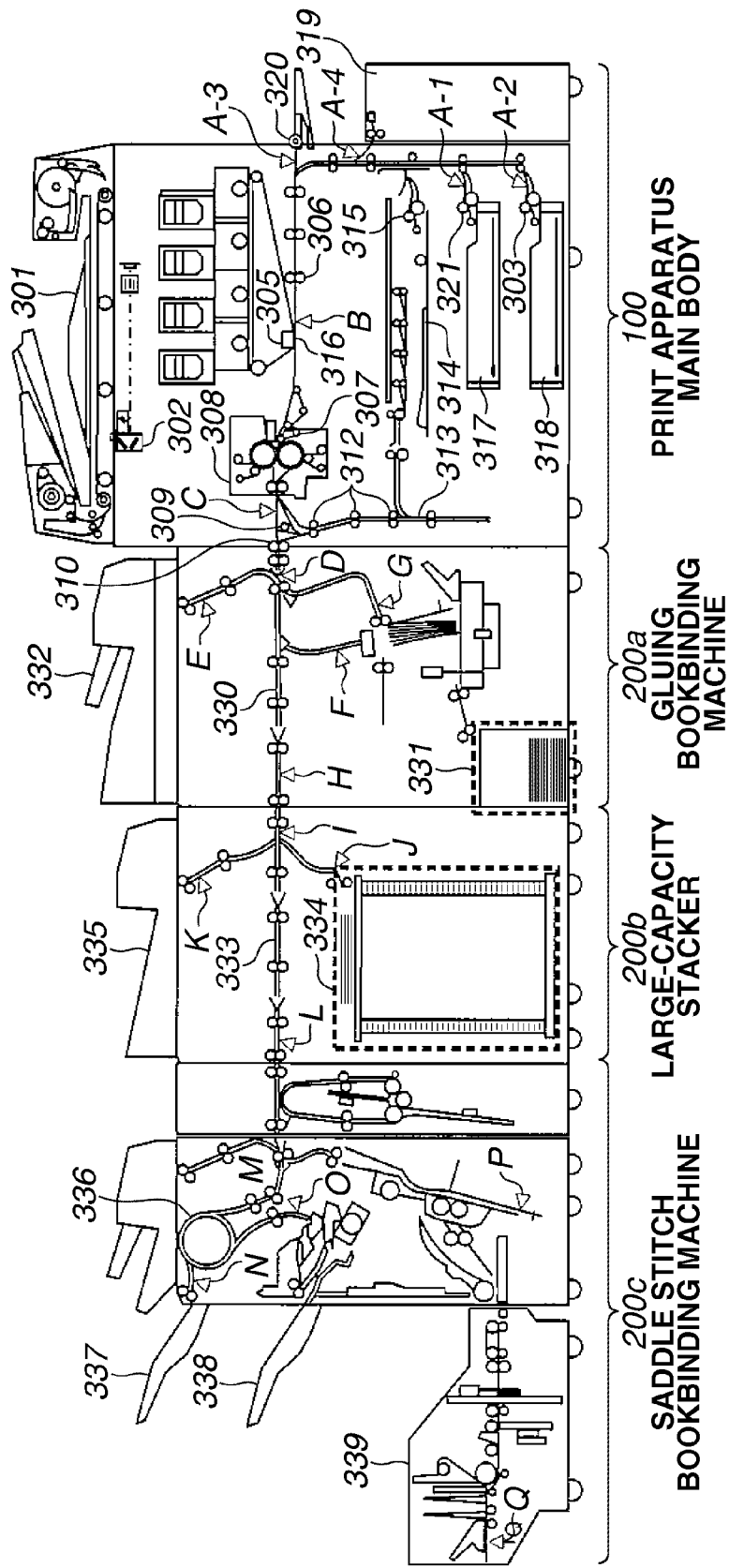
FIG. 3 illustrates a cross-sectional view of the configuration of the print system according to the first exemplary embodiment.

FIG. 3 illustrates a cross-sectional view of the configuration of the print system 1000 according to the present exemplary embodiment.

Referring to FIG. 3, an automatic document feeder (ADF) 301 arranged to the scanner unit 201 sequentially separates a plurality of documents set on a document tray by a user, starting from the first sheet, and conveys the documents to a platen. A reading unit 302 reads an image of the document conveyed to the platen with a charge-coupled device (CCD), and converts the read image into image data. The CPU 205A stores the converted image data to a memory such as the RAM 208 or the HDD 209.

The print apparatus 100 which is a tandem-type color printer including a plurality of photosensitive drums includes sheet feed units such as sheet cassettes 317 and 318 and a manual feed tray 320, and feeds the sheets from one of the sheet feed units. A sheet feed deck 319 that can contains a large amount of sheets is also connected to the print apparatus 100 as the sheet feed unit, and the sheets can be fed from the sheet feed deck 319. When conveying the sheet fed from one of the sheet feed units to a registration roller 306, the print apparatus 100 temporarily stops the sheet to synchronize an operation with an intermediate transfer belt 305.

When the sheet waits for transfer at a position of the registration roller 306, a sheet for printing a next page can be fed from any of the sheet cassettes 317 and 318, the sheet feed deck 319, and the manual feed tray 320. With this sheet feed operation, a conveyance interval between a plurality of sheets can be shortened, and printing productivity can be improved.

The image data that is temporarily stored in the RAM 208 or the HDD 209 is transferred to the printer unit 203, and is converted into recording laser beams with four colors of yellow (Y), magenta (M), cyan (C), and black (K) by a laser recording unit (not illustrated). The photosensitive drums of the respective colors are irradiated with the recording laser beams, and electrostatic latent images corresponding to the respective colors are formed on the photosensitive drums. With use of toners of four colors supplied from toner cartridges, toner development is performed and visualized toner images are temporarily transferred to the intermediate transfer belt 305 from the photosensitive drums.

The intermediate transfer belt 305 is rotated at a constant speed in a clockwise direction in FIG. 3. When the intermediate transfer belt 305 is rotated at a predetermined position, the conveyance of the sheet waited at the position of the registration roller 306 is started. The predetermined position means a position at which the leading edge of the sheet is conveyed to a secondary transfer position 316 when a leading edge of an image transferred onto the intermediate transfer belt 305 reaches the secondary transfer position 316. At the secondary transfer position 316, the toner image on the intermediate transfer belt 305 is thus transferred to the sheet. The sheet to which the toner image is transferred is further conveyed by a belt 307. The toner image is fixed to the sheet with pressure and heat from a fixing device 308. Then, the sheet is conveyed to the sheet conveyance path and discharged.

A sheet discharge flapper 309 can be swung around a swing axis as center, and determines the sheet conveyance direction. The sheet discharge flapper 309 is swung in the clockwise direction in FIG. 3. If the sheet discharge flapper 309 is fixed at the position, the sheet discharged from the fixing device 308 is conveyed in the horizontal direction, and is conveyed to a gluing bookbinding machine 200a as one of the sheet processing apparatuses 200 by a sheet discharge roller 310. Thus, one-sided printing is executed.

On the other hand, if images are printed on two sides of the sheet, the sheet discharge flapper 309 is swung in the counterclockwise direction in FIG. 3, and is fixed at the position. A course of the sheet discharged from the fixing device 308 is changed to the downward direction, and the sheet is transmitted to a two-sided conveyance unit. The two-sided conveyance unit includes a reversing flapper 311, a conveyance roller 312, a reversing guide 313, and a two-sided tray 314. The reversing flapper 311 can be swung around a swing axis as center, and determines the sheet conveyance direction. In the case of two-sided printing, the CPU 205A swings the reversing flapper 311 in the counterclockwise direction in FIG. 3, and controls the sheet to which an image is printed on a first side thereof to be conveyed to the reversing guide 313 via the conveyance roller 312. Further, in a state that the trailing edge of the sheet is sandwiched by conveyance rollers arranged at an entrance of the reversing guide 313, the CPU 205A temporarily stops the conveyance rollers. Subsequently, the reversing flapper 311 is swung in the clockwise direction in FIG. 3, and the conveyance rollers are rotated in the opposite direction. Consequently, the sheet is switched back and conveyed. Thus, the trailing edge and the leading edge of the sheet are exchanged, and the CPU 205A controls the sheet to be guided to the two-sided tray 314.

The two-sided tray 314 temporarily stores the sheet. Then, a sheet refeed roller 315 refeeds the sheet to the registration roller 306. At that time, the sheet is fed in a state in which a second side of the sheet faces the intermediate transfer belt 305. The second side is the other side of the sheet, i.e. the first side, on which the toner has been transferred in the transfer process. Similarly to the above-described transfer process of the first side of the sheet, an image is formed to the second side thereof. After the fixing device 308 fixes the image formed to the second side of the sheet, the sheet discharge roller 310 conveys the sheet to which the image is formed to the gluing bookbinding machine 200a as one of the sheet processing apparatuses 200. Consequently, the two-sided printing is executed.

The sheet to which the image is printed to one side or two sides thereof by the print apparatus 100 is selectively conveyed to the gluing bookbinding machine 200a, a large-capacity stacker 200b, or a saddle stitch bookbinding machine 200c as the sheet processing apparatuses 200 according to a print setting via the operation unit 204. If execution of the gluing bookbinding is set, the sheet is conveyed to the gluing bookbinding machine 200a, subjected to the bookbinding processing, and discharged to a bookbinding print product discharge unit 331. More specifically, in the bookbinding processing, a plurality of sheets to which the image is printed by the print apparatus 100 is covered with a sheet fed from an inserter 332 if necessary, and subjected to the bookbinding. A printed product subjected to the bookbinding is stored to the bookbinding print product discharge unit 331.

If execution of processing for stacking a large amount of sheets is set, the sheet to which the image is printed by the print apparatus 100 is conveyed to the large-capacity stacker 200b via a sheet conveyance path 330 in the gluing bookbinding machine 200a. The large-capacity stacker 200b discharges the received sheet to an escape tray 335 or a stacking unit 334.

If the sheet processing is not set, the sheet to which the image is printed by the print apparatus 100 is conveyed to the saddle stitch bookbinding machine 200c via the sheet conveyance path 330 in the gluing bookbinding machine 200a and a sheet conveyance path 333 in the large-capacity stacker 200b. The saddle stitch bookbinding machine 200c discharges the received sheet to a sheet discharge unit 337 via a sheet conveyance path 336.

If execution of staple processing is set, the saddle stitch bookbinding machine 200c stores the received sheet to an intermediate tray via the sheet conveyance path 336. When sheets of one bundle for stapling are stored in the intermediate tray, the saddle stitch bookbinding machine 200c staples the sheets of one bundle and discharges the bundle to a sheet discharge unit 338.

If execution of the saddle stitching bookbinding processing is set, the saddle stitch bookbinding machine 200c executes the saddle stitching bookbinding processing of the received sheets, and discharges the sheets to a saddle stitching bookbinding bundle discharge unit 339.

In the print system 1000, the sheet feeding, printing, post-processing, and sheet discharge are executed as described above.

The print system 1000 includes sheet detection sensors in the respective sheet conveyance paths provided for the print apparatus 100, the gluing bookbinding machine 200a, the large-capacity stacker 200b, and the saddle stitch bookbinding machine 200c. More specifically, the sheet detection sensors are disposed to an entrance and/or an exit of the respective devices, and a branch point and/or a junction point of the sheet conveyance paths. Referring to FIG. 3, sheet detection sensors A to Q are arranged to positions illustrated by triangle symbols. The CPU 205A receives signals from the sheet detection sensors A to Q, and detects the presence or absence of the sheet conveyed via the sheet conveyance path and the position of the sheet. The sheet detection sensors A to Q detect a bundle jam in post-processing of the sheet bundle on a predetermined conveyance path when a plurality of print jobs with different sheet post-processing functions is continuously processed. More specifically, a plurality of sheet detection sensors A to Q is provided, so that a bundle jam in the post-processing of the sheet or the sheet bundle can be detected on the predetermined conveyance path.

If, for example, a signal is continuously output from one of the sheet detection sensors for a predetermined time or more, the CPU 205A determines that a sheet retention jam occurs at a position corresponding to the sheet detection sensor that continuously transmits the signal. Alternatively, if a sheet passing through one sheet detection sensor does not pass through the next sheet detection sensor for a predetermined time or more, the CPU 205A determines that a sheet delay jam occurs between the sheet detection sensors. If the sheet jam occurs in the sheet conveyance path in the print system 1000, the CPU 205A cancels the print processing. According to the signals from the sheet detection sensors A to Q, a position of the sheet to be removed and a removal sequence are displayed as guidance on the operation unit 204. Thus, a user can understand the position of the sheet to be removed in the print system 1000, open the door of the device in which the jam occurred, and remove the sheet from the sheet conveyance path according to the guidance. After removing all jammed sheets or sheet bundles, the opened door is closed, and the user issues an instruction to restart printing via the operation unit 204. The CPU 205A receives an instruction to restart printing and then restarts the printing.

Sheet detection sensors A-1, A-2, A-4, and A-3 are provided as sheet feed sensors corresponding to sheet feed ports of the respective sheet feed units, that is the sheet cassettes 317 and 318, the sheet feed deck 319, and the manual feed tray 320. The sheet detection sensors A-1, A-2, A-4, and A-3 detect the fed sheet, and transmit sheet detection signals to the CPU 205A. The CPU 205A counts the number of the sheets fed from the respective sheet feed units based on the sheet detection signals received from the sheet detection sensors A-1, A-2, A-4, and A-3. The CPU 205A stores the counted value in the RAM 208. Consequently, the CPU 205A grasps the number of the sheets fed from the sheet feed units by the execution of the job.

The sheet discharge unit 337 in the saddle stitch bookbinding machine 200c includes a sheet detection sensor N. The sheet detection sensor N detects a sheet discharged to the sheet discharge unit 337, and transmits a sheet discharge signal to the CPU 205A. The CPU 205A determines whether all sheets of the print job in the print processing are discharged based on the sheet discharge signal. If the CPU 205A determines that all sheets are discharged, the CPU 205A deletes the print job stored in the HDD 209. The CPU 205A counts the number of the discharged sheets based on the received sheet discharge signal, and stores the counted value in the RAM 208. Consequently, the CPU 205A grasps the number of sheets discharged to the sheet discharge unit 337 by the execution of the job. The saddle stitch bookbinding machine 200c includes a saddle stitching bookbinding processing unit. When a job of the saddle stitching bookbinding processing is executed, sheets are stored in the saddle stitching bookbinding processing unit until the number of sheets reaches the number of sheets for the saddle stitching bookbinding processing.

The saddle stitching bookbinding processing unit includes a sheet detection sensor P. The sheet detection sensor P detects a sheet stored in the saddle stitching bookbinding processing unit, and transmits a sheet storage signal to the CPU 205A. When the CPU 205A detects that the number of sheets for the saddle stitching bookbinding processing is stored in the saddle stitching bookbinding processing unit, the CPU 205A issues an instruction to execute the saddle stitching bookbinding processing. Upon receiving the instruction to execute the saddle stitching bookbinding processing, the saddle stitch bookbinding machine 200c forms a saddle stitching bookbinding bundle, and discharges a bookbinding bundle to the saddle stitching bookbinding bundle discharge unit 339. The saddle stitching bookbinding bundle discharge unit 339 includes a sheet detection sensor Q. The sheet detection sensor Q detects that the saddle stitching bookbinding bundle is discharged, and transmits a bundle discharge signal to the CPU 205A. The CPU 205A determines whether all sheet bundles of the print job in the print processing are discharged based on the received bundle discharge signal. If the CPU 205A determines that all bundles are discharged, the CPU 205A deletes the print job stored in the HDD 209. The CPU 205A can detect a bundle jam in post-processing of the sheet bundle in a case that a plurality of print jobs with different sheet post-processing functions is subsequently processed based on an output of the sheet detection sensor Q.

According to the present exemplary embodiment, the print apparatus 100 is described as a 4-drum (4D) type color multifunctional peripheral (MFP). However, the configuration of the print apparatus 100 is not limited to this, and may be a monochrome MFP or a 1-drum (1D) type color MFP.

The operation and the configuration of the present exemplary embodiment are described above using a copy job as an example. In a case of a print job, a similar print operation is executed in the present configuration using print data from an external I/F in place of image data from the scanner unit 201.

[Configuration of Operation Unit 204 Corresponding to One Example of UI Unit in the Print System 1000]

The operation unit 204 provided for the print apparatus 100 of the print system 1000 is described with reference to FIG. 4. The operation unit 204 corresponds to an example of a user interface unit (hereinafter, referred to as a UI unit) in the print system 1000.

Figure 4:
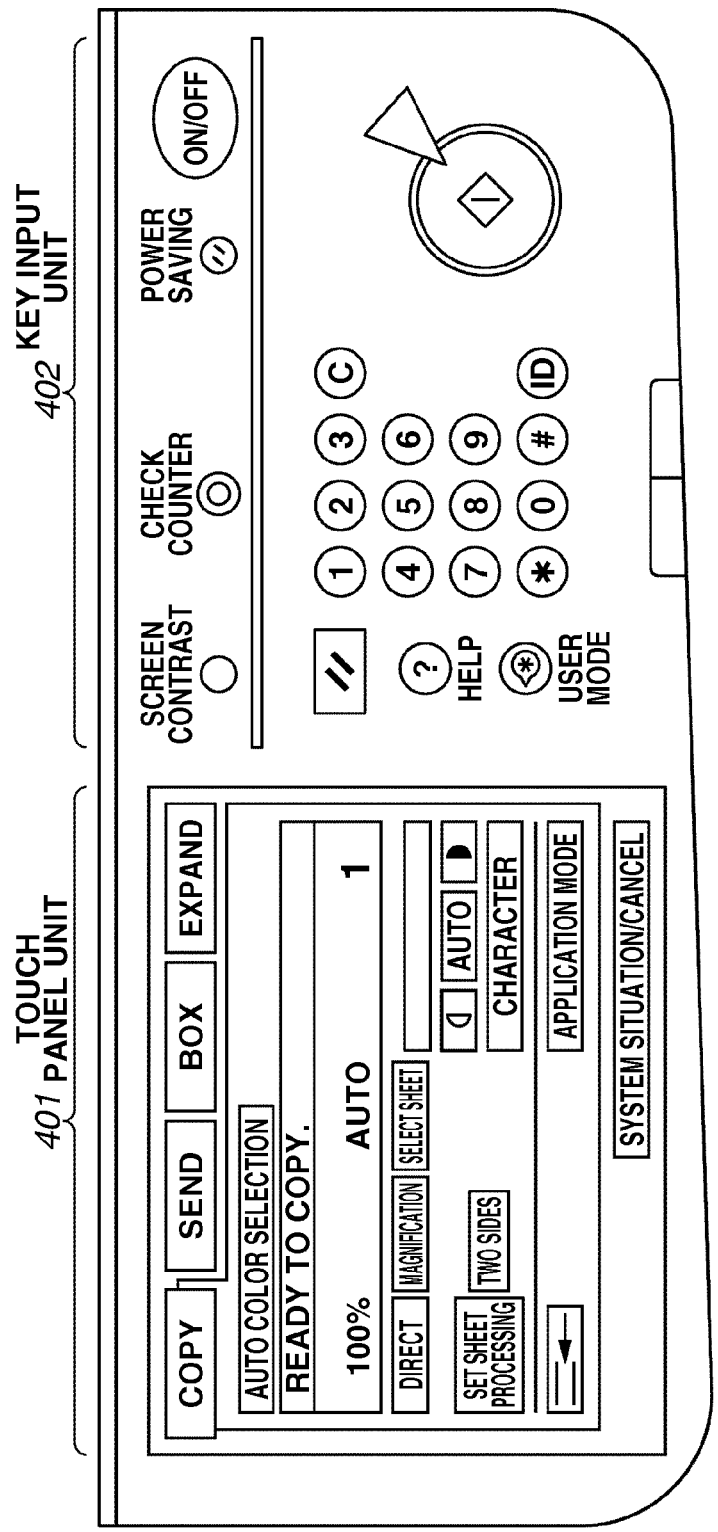
FIG. 4 illustrates a plan view of a configuration of an operation unit in FIG. 2.

FIG. 4 is a plan view of the configuration of the operation unit 204 illustrated in FIG. 2. Referring to FIG. 4, the operation unit 204 includes a key input unit 402 that can receive a user operation using a hardware key and a touch panel unit 401 as an example of a display unit that can receive a user operation using a software key (display key). Assuming that the present exemplary embodiment includes the above-described configuration, the CPU 205A corresponding to one example of the control unit provided for the print system 1000 executes the following control.

Figure 5:
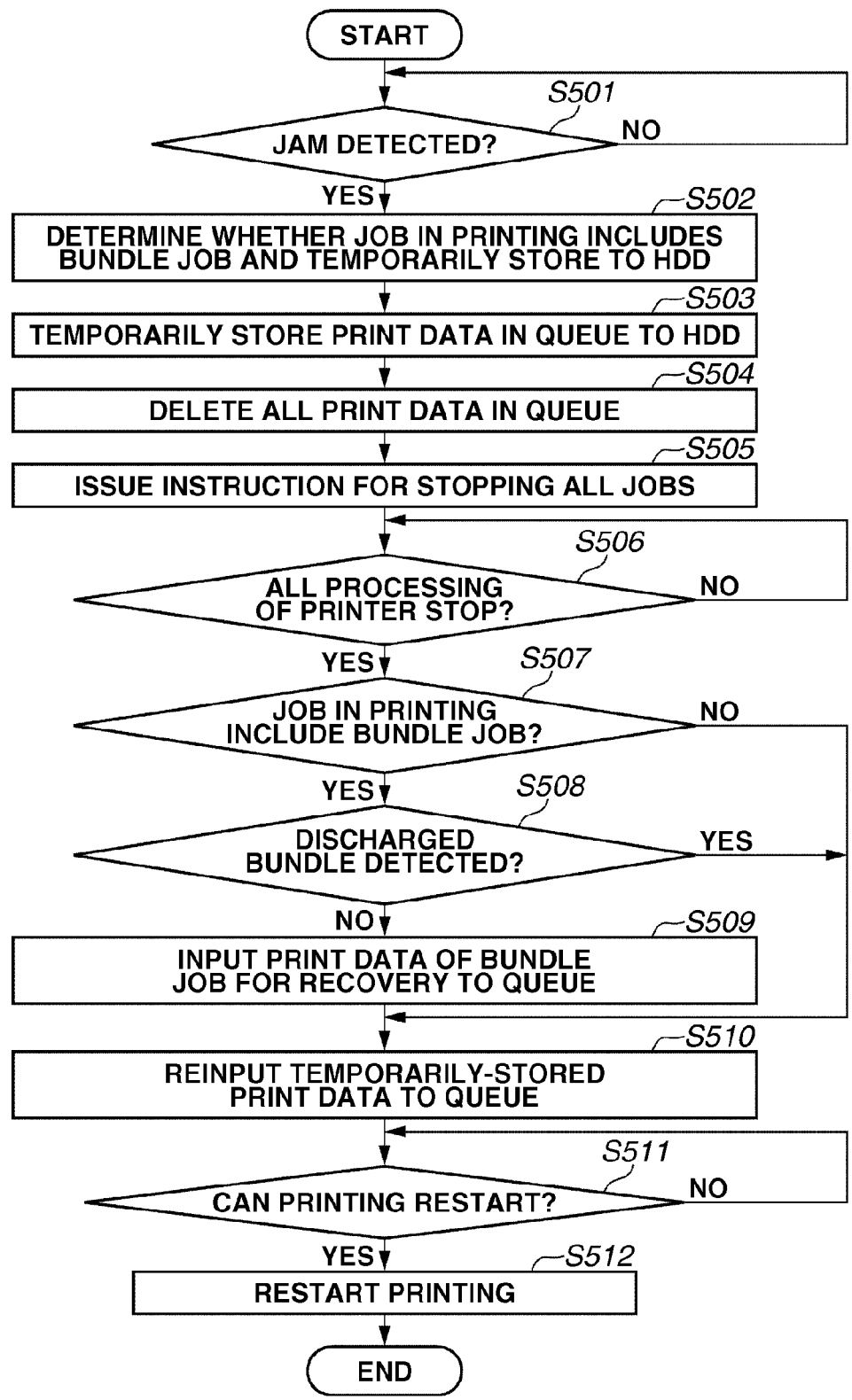
FIG. 5 is a flowchart illustrating data processing performed in the print system.

According to the present exemplary embodiment, a characteristic flow of recovery processing when a bundle jam occurs is described with reference to FIG. 5. FIG. 5 is a flowchart illustrating data processing of the print system 1000 according to the present exemplary embodiment. FIG. 5 illustrates an example of processing executed by the CPU 205A in FIG. 2, and the processing in each step is performed by the CPU 205A reading and executing a necessary program from the ROM 207.

In step S501, the CPU 205A detects whether a jam of a sheet or a sheet bundle occurs in the print system 1000 based on outputs of the sheet detection sensors A to Q. If the CPU 205A detects that the jam occurs (YES in step S501), the processing advances to step S502.

In step S502, the CPU 205A reads data of the job during printing stored in the HDD 209, and determines whether the job in the print processing includes a job having a setting of bundle bookbinding (hereinafter, referred to as a bundle job) when the jam occurs. If the CPU 205A determines that the job in the print processing includes the bundle job, the CPU 205A temporarily stores information about a bundle job print flag to the RAM 208.

In step S503, the CPU 205A temporarily stores, to the HDD 209, the print data which exists in a print data storage area (hereinafter, referred to as a queue) on a memory and is rasterized in print order to the RAM 208 from the HDD 209 for print processing. Then, the processing advances to step S504. In step S504, the CPU 205A deletes the print data in the queue temporarily stored to the HDD 209 in step S503, and the processing advances to step S505.

In step S505, the CPU 205A issues an instruction to stop the print processing of the print system 1000, and the processing advances to in step S506. In step S506, the CPU 205A checks whether all processings are stopped. If the all processings are stopped (YES in step S506), then, the processing advances to step S507.

In step S507, the CPU 205A reads the bundle job print flag temporarily stored in step S502, and determines whether the bundle job is in the print processing. If the CPU 205A determines that the bundle job is in the print processing (YES in step S507), the processing advances to step S508. If the CPU 205A determines that the bundle job is not in the print processing (NO in step S507), the processing advances to step S510. In step S510, normal recovery processing is performed. The normal recovery processing means an operation of recovery processing from a sheet (head print data remaining in the queue) which is supposed to be discharged next to the final discharged sheet that is finally detected after detection of the occurrence of the jam.

In step S508, the CPU 205A determines whether the bundle of sheets is discharged from the bundle job which is in the printing when the occurrence of the jam is detected before the stop of the print processing. More specifically, if the CPU 205A detects that the bundle of sheets is discharged (YES in step S508), the CPU 205A determines that a target of the recovery processing is not the bundle job in the bundle bookbinding processing but the print job that is not subjected to the bundle bookbinding processing subsequent to the bundle job. Then, the processing advances to step S510, similarly to the normal recovery processing.

If the CPU 205A does not detect that the bundle of sheets is not discharged (NO in step S508), the CPU 205A determines that the target of the recovery processing is the bundle job in the bundle bookbinding processing. Thus the processing advances to step S509, and the CPU 205A performs the normal bundle job recovery processing. The normal bundle job recovery processing means to start the recovery processing from a head sheet of the bundle job as a recovery start target, in place of a recovery start target (from the head print data remaining in the queue) in the normal recovery processing. If the head sheet of the bundle job is the recovery start target, the print data of the entire bundle job is inserted into the head of the queue, and the print data remaining in the queue is registered to the queue subsequent to the back of a bundle job for recovery.

In step S509, the CPU 205A obtains the corresponding print data from the HDD 209 with respect to the bundle job needs to be recovered which is detected in steps S507 and S508, and re-registers the print data to the queue. Then, the processing advances to step S510.

In step S510, the CPU 205A re-inputs the print data temporarily stored in the HDD 209 in step S503 to the queue. Then, the processing advances to step S511. In step S511, the CPU 205A waits for jam removal processing by the user. In step S511, the CPU 205A checks a state of the print system 1000 until the print system 1000 becomes a printable state. If the print system 1000 is in the printable state (YES in step S511), then in step S512, the print processing restarts based on the print data registered to the queue.

According to the above-described control, the print system 1000 can be provided in which a sheet is not used wastefully if a jam occurs in the sheet processing apparatus and the recovery processing of a bundle job can be performed efficiently.

Figure 6:
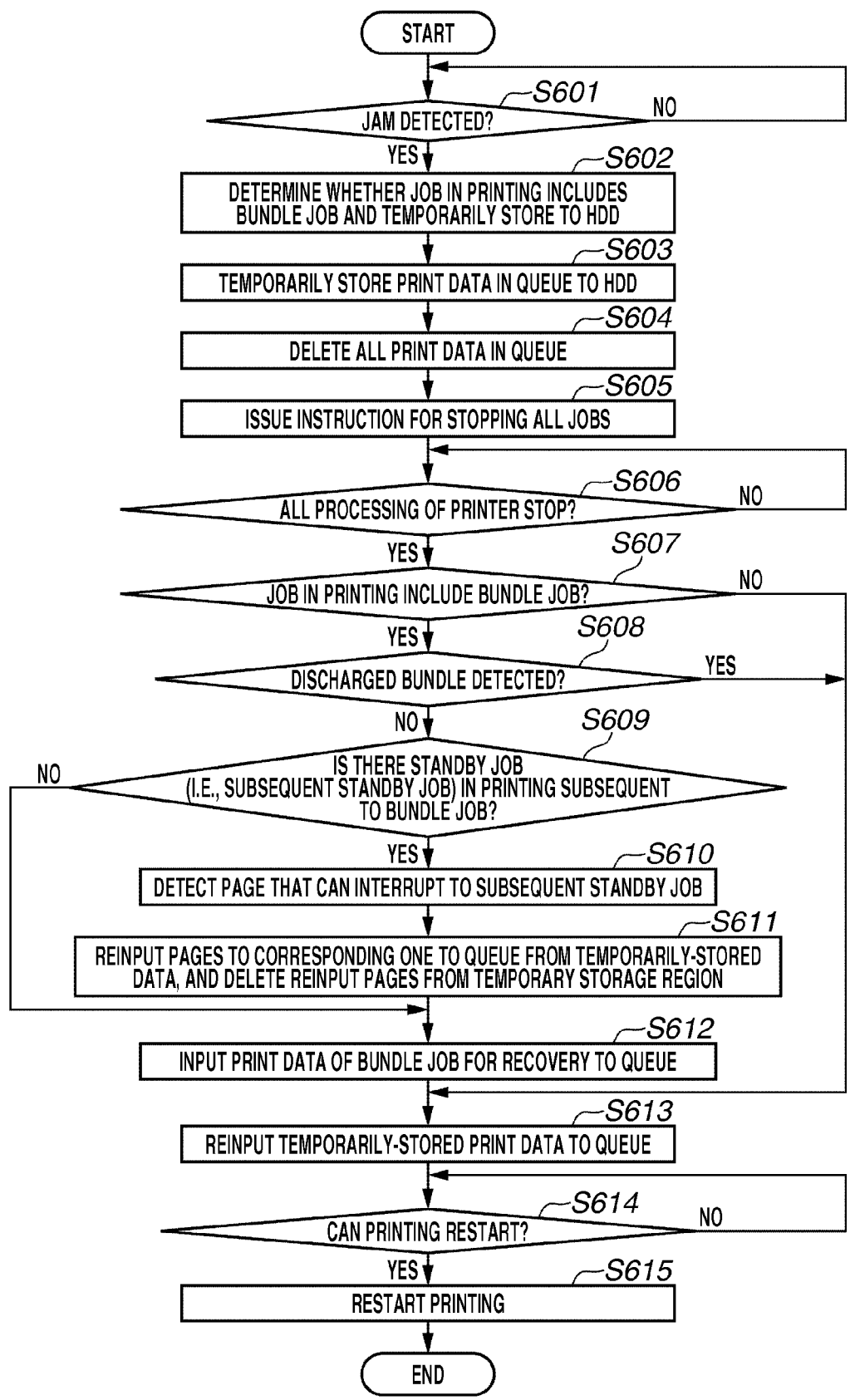
FIG. 6 is a flowchart illustrating data processing performed in the print system.

FIG. 6 is a flowchart illustrating a data processing sequence of a print system according to a second exemplary embodiment of the present invention. FIG. 6 illustrates an example of recovery processing when a bundle jam occurs. Referring to FIG. 6, processing in steps S601 to S608 is similar to that according to the first exemplary embodiment. Thus, a specific description thereof is omitted. According to the present exemplary embodiment, the flowchart indicates processing executed by the CPU 205A, and processing in each step is realized by the CPU 205A reading and executing a program from the ROM 207.

In step S608, if the CPU 205A does not detect that the bundle of sheets is discharged (NO in step S608), it is determined that a recovery processing target is the bundle job in the bundle bookbinding processing. Then, the processing advances to step S609.

In step S609, the CPU 205A determines whether a job (hereinafter, referred to as a subsequent standby job) for which the print processing has started and stops in the middle exists in print jobs subsequent to a print job (bundle job) in which trimming or the like is performed on a sheet bundle. In this step, the CPU 205A compares data of the print job in the printing stored in the HDD 209 with the print data temporarily stored from the queue, and determines whether there is a subsequent standby job.

More specifically, if the CPU 205A detects a bundle jam based on an output of the sheet detection sensor Q, the CPU 205A executes subsequent job determination processing for determining whether there is a subsequent print job for which the print processing is executed in parallel with the print job in which the bundle jam occurs. More specifically, the CPU 205A determines whether the print data to be printed to the head sheet of the print job subsequent to the bundle job remains in the queue. If the CPU 205A determines that there is no subsequent standby job (NO in step S609), the processing advances to step S612. In step S612, the normal bundle job recovery processing is performed. If the CPU 205A determines that there is the subsequent standby job (YES in step S609), the processing advances to step S610.

In step S610, the CPU 205A detects a page that can be inserted into the subsequent standby job. More specifically, the CPU 205A detects a parting of the corresponding subsequent standby jobs, a parting of the bundle processing, or a parting of the job. Then, the processing advances to step S611.

In step S611, the CPU 205A re-inputs the print data corresponding to pages which are detected in step S610 from the print data temporarily stored in step S603 to the queue, and deletes the re-input print data from the HDD 209 to which the print data is temporarily stored. In a case where a plurality of bundle jobs need to be recovered is set, a subsequent standby job is for printing a next copy of the bundle job, and the completely similar contents are printed, the CPU 205A may not perform the interrupt processing. More specifically, the CPU 205A controls only a part of the print data of the corresponding bundle job to be registered to the queue after the final part from the HDD 209.

In step S612, the CPU 205A obtains the corresponding print data from the HDD 209 with respect to the bundle job needs to be recovered which is detected in steps S607 and S608, and re-registers the print data to the queue. Then, the processing advances to step S613.

In step S613, the CPU 205A re-inputs the print data temporarily stored in the HDD 209 in step S603 to the queue. Then in step S614, the CPU 205A waits for the jam removal processing by the user.

In step S614, the CPU 205A checks a state of the print system 1000 until the print system 1000 becomes a printable state. If the CPU 205A determines that the print system 1000 is in the printable state (YES in step S614), then in step S615, the print processing is restarted based on the print data registered in the queue.

According to the above-described control, the print system 1000 can be provided in which a sheet is not used wastefully if a jam occurs in the sheet processing apparatus and the recovery processing of a bundle job can be performed surely and rapidly.

Figure 7:
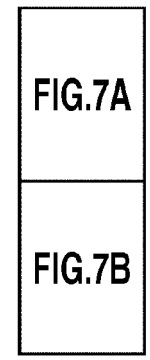
FIG. 7 (including FIGS. 7A and 7B) is a flowchart illustrating data processing performed in the print system.
Figure 7A:
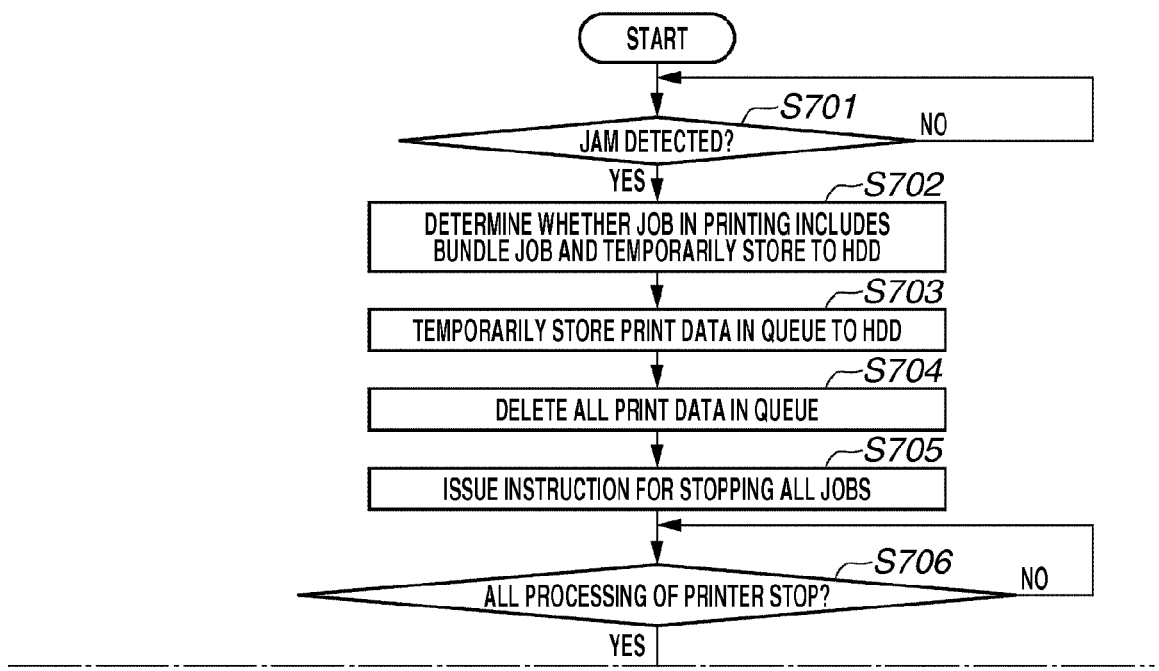

FIG. 7 (including FIGS. 7A and 7B) is a flowchart illustrating a data processing sequence of a print system according to a third exemplary embodiment of the present invention. FIG. 7 illustrates an example of recovery processing when a bundle jam occurs. Processing in steps S701 to S709 in FIG. 7 is similar to that according to the second exemplary embodiment. Thus, a specific description thereof is omitted. According to the present exemplary embodiment, the flowchart in FIG. 7 indicates processing executed by the CPU 205A, and processing in each step is realized by the CPU 205A reading and executing a program from the ROM 207.

In step S709, the CPU 205A determines whether there is a subsequent standby job. If the CPU 205A determines that there is no subsequent standby job (NO in step S709), the processing advances to step S715. In step S715, the CPU 205A performs the normal bundle job recovery processing. If the CPU 205A determines that there is the subsequent standby job (YES in step S709), the processing advances to step S710.

In step S710, the CPU 205A determines whether the bundle job for recovery can be immediately inserted into a current standby position of the subsequent standby job. If the CPU 205A determines that the bundle job for recovery can be inserted (YES in step S710), then in step S715, the CPU 205A performs the normal bundle job recovery processing. If the CPU 205A determines that the bundle job for recovery cannot be inserted (NO in step S710), the processing advances to step S711.

For example, the CPU 205A determines whether the bundle processing of the subsequent standby job is set. If the CPU 205A determines that the bundle processing is set, the CPU 205A may determine that the bundle job cannot be inserted. Further, the CPU 205A determines whether setting to feed sheets which are handled as one set of a plurality of sheets from the same sheet feed stage is made to a job in which the bundle jam occurs and to the subsequent standby job. If it is determined that the same sheet feed setting is made, the CPU 205A may determine that the bundle job cannot be inserted. Furthermore, as the determination reference for above-described cases, only if the remaining number of copies to be printed of the subsequent standby job is one, the CPU 205A may determine that the bundle job cannot be inserted, and if the remaining number of copies to be printed is two or more, the CPU 205A may determine that the bundle job can be inserted at the parting of copies.

According to the present exemplary embodiment, if the CPU 205A determines that there is the subsequent print job, processing of all print jobs during processing is canceled. Then, the CPU 205A performs interruption determination processing which is illustrated in step S710. In the interruption determination processing, the CPU 205A determines, after recovery of the print job which caused the bundle jam and to be inserted into a subsequent print job to be interrupted, whether the job processing can normally restart from a halfway of the interrupted print job.

Figure 8:
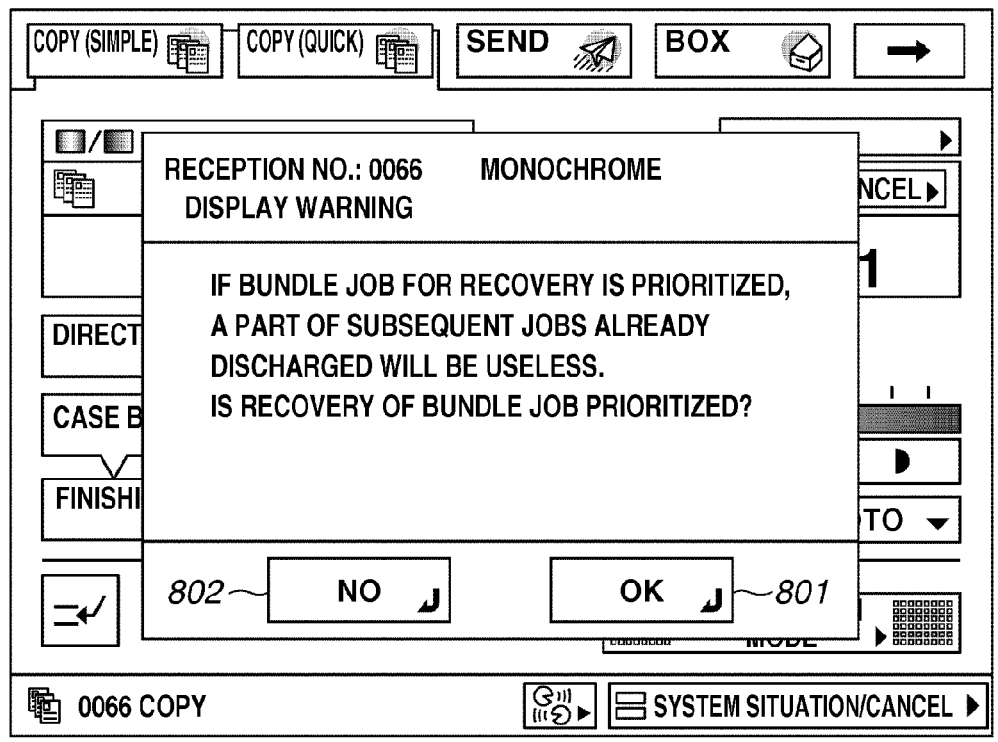
FIG. 8 illustrates a user interface (UI) screen that can be displayed on the operation unit in FIG. 2.

If the CPU 205A determines that the job processing cannot normally restart from the halfway of the interrupted print job (NO in step S710), in step S711, a user interface (UI) screen illustrated in FIG. 8 is displayed. More specifically, in step S711, a screen is displayed to receive from a user any of an instruction to prioritize execution of the print job which caused the bundle jam and an instruction to prioritize execution of the subsequent print job. If the CPU 205A determines that the instruction received from the user via the UI screen in FIG. 8 is to prioritize execution of the print job which caused the bundle jam, recovery of the print job which caused the bundle jam is prioritized. If the CPU 205A determines that the instruction received from the user via the UI screen in FIG. 8 is not to prioritize execution of the print job which caused the bundle jam, CPU 205A controls the recovery execution order such that the recovery of the print job which caused the bundle jam is executed after the subsequent print job is completed.

In step S711, the CPU 205A displays a warning screen as illustrated in FIG. 8 on the operation unit 204, and receives an instruction from the user. FIG. 8 illustrates a UI screen that can be displayed on the operation unit 203 in FIG. 2. The CPU 205A displays the UI screen in FIG. 8 on the operation unit 204, and controls the display such that the user can select whether to prioritize the bundle job for recovery or to perform the bundle job for recovery after the already printed subsequent standby job.

Referring to FIG. 8, when the CPU 205A detects that an OK button 801 is pressed, the CPU 205A determines that the bundle job for recovery is prioritized. If the CPU 205A detects that a NO button 802 is pressed, the CPU 205A determines that the subsequent standby job is prioritized. The user can check a warning message "If the bundle job for recovery is prioritized, a useless sheet will be generated due to a part of subsequent jobs already discharged." displayed on the UI screen.

In step S712, if the CPU 205A receives an instruction to prioritize the bundle job for recovery in response to the instruction received in step S711, the processing advances to step S713. In step S713, the CPU 205A obtains the entire print data of each print job which is the original one of the print data from the print data pieces temporarily stored in step S703 from the HDD 209, and the processing advances to step S714.

In step S714, the CPU 205A deletes all the print data pieces temporarily stored in step S703, instead stores the print data obtained in step S713 to the HDD 209. Then, the processing advances to step S715.

In step S715, the CPU 205A obtains the print data corresponding to the bundle job needs to be recovered which is detected in steps S707 and S708 from the HDD 209, and re-registers the print data to the queue. In step S716, the CPU 205A re-inputs the print data temporarily stored in the HDD 209 to the queue. The processing advances to step S719. In step S719, the CPU 205A waits for jam removal processing by the user.

In step S712, if the CPU 205A receives the instruction for prioritizing the subsequent standby job (NO in step S712), then in step S717, the CPU 205A detects a page that can be inserted into the subsequent standby job. More specifically, the CPU 205A detects a parting of the corresponding subsequent standby job or a parting of the bundle processing, and the processing advances to step S718. In other words, by executing the processing in step S717, the CPU 205A can make a start of insertion of the print job which caused the bundle jam wait until when a parting of pages at which the print job which caused the bundle jam can be inserted into a print job to be interrupted or when the subsequent print job is completed.

In step S718, the CPU 205A re-inputs the print data corresponding to the pages which are detected in step S717 from the print data temporarily stored in step S703 to the queue and deletes the re-input print data from the HDD 209 that temporarily stores the re-input print data, and the processing advances to step S715.

In step S719, the CPU 205A checks a state of the print system 1000 until the print system 1000 becomes a printable state. If the print system 1000 is in the printable state (YES in step S719), then in step S720, the CPU 205A restarts the print processing based on the print data registered to the queue.

According to the above-described control, the print system 1000 can be provided in which a sheet to be used wastefully can be minimized if a jam occurs in the sheet processing apparatus and the recovery processing of a bundle job can be efficiently performed without fail. In other words, according to the present exemplary embodiment, if a jam occurs in the sheet processing apparatus, a sheet to be used wastefully can be minimized, and a user can easily select an intended recovery means, so that recovery processing can be efficiently performed.

For example, in a case where there is a job for executing bundle processing which is the same as a subsequent standby job, by employing the above-described means, the bundle processing of the subsequent standby job can be correctly executed and a required output product can be certainly obtained without generating a useless output product.

Further, if the above-described means is used in a case where a job in which a bundle jam has been detected and a subsequent standby job use a plurality of sheets as one set which are fed from the same sheet feed stage, interruption is allowed only at a position where the order of sheets to be used as one set of the plurality of sheets are not changed. Thus, a correct output product can be obtained.

According to the present exemplary embodiment, the example is given of controlling an operation to allow a user to select the priority between the recovery of the bundle job and the subsequent standby job. However, the present exemplary embodiment is not limited to this configuration. In the case of a job into which a subsequent standby job cannot be inserted, the subsequent standby job may be always prioritized and printed.

Further, according to the present exemplary embodiment, the example is given of controlling an operation to allow a user to select the priority between the recovery of the bundle job and the subsequent standby job. However, the present exemplary embodiment is not limited to this configuration. If the number of print pages of the subsequent standby job is equal to or less than a certain number, the subsequent standby job may be always prioritized and printed.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2012-078766 filed Mar. 30, 2012, which is hereby incorporated by reference herein in its entirety.

What is claimed is:

1. A print system including a print apparatus configured to execute print processing and a sheet processing apparatus configured to execute sheet processing of a sheet to which the print processing is executed, the print system comprising:
   a detection unit configured to detect that a jam occurs in the sheet processing apparatus during execution of the sheet processing based on a first job;
   a control unit configured to execute a recovery job corresponding to the first job in a case that the detection unit detects that the jam occurs in the sheet processing apparatus;
   a determination unit configured to determine whether a second job which is a job subsequent to the first job is being executed in a case that the detection unit detects that the jam occurs in the sheet processing apparatus; and
   a bundle determining unit configured to determine whether or not the first job and second job are bundled;
   wherein, in a case (1) that the determination unit determines that the second job is being executed, and (2) the bundle determining unit determines the first or second job are bundled, the control unit controls a job execution order to execute the recovery job after executing the second job.

2. The print system according to claim 1, further comprising:
a storage unit configured to store print data related to the first job,
wherein the control unit executes the recovery job based on the print data stored by the storage unit.

3. The print system according to claim 1,
wherein the control unit stops execution of the second job in a case that the detection unit detects that a jam occurs in the sheet processing apparatus, and
the control unit restarts the execution of the second job in a case that the jam is removed.

4. A print system including a print apparatus configured to execute print processing and a sheet processing apparatus configured to execute sheet processing of a sheet to which the print processing is executed, the print system comprising:
a detection unit configured to detect that a jam occurs in the sheet processing apparatus during execution of the sheet processing based on a first job;
a control unit configured to execute a recovery job corresponding to the first job in a case that the detection unit detects that the jam occurs in the sheet processing apparatus;
a determination unit configured to determine whether a second job which is a job subsequent to the first job is being executed in a case that the detection unit detects that the jam occurs in the sheet processing apparatus; and
a bundle determining unit configured to determine whether or not the first job and second job are bundled;
wherein, in a case (1) that the determination unit determines that the second job is being executed, and (2) the bundle determining unit determines the first or second job are bundled, the control unit stops the second job from being executed and executes the recovery job.

5. The print system according to claim 4,
wherein the control unit controls a job execution order to execute a job for printing remaining pages of the stopped second job after executing the recovery job.

6. The print system according to claim 4, further comprising:
a storage unit configured to store print data related to the first job,
wherein the control unit executes the recovery job based on the print data stored by the storage unit.

7. The print system according to claim 4,
wherein the control unit stops execution of the second job in a case that the detection unit detects that a jam occurs in the sheet processing apparatus, and
the control unit executes the recovery job in a case that the jam is removed.

8. A print system including a print apparatus configured to execute print processing and a sheet processing apparatus configured to execute sheet processing of a sheet to which the print processing is executed, the print system comprising:
a detection unit configured to detect that a jam occurs in the sheet processing apparatus during execution of the sheet processing based on a first job;
a control unit configured to execute a recovery job corresponding to the first job in a case that the detection unit detects that the jam occurs in the sheet processing apparatus; and
a determination unit configured to determine whether a second job which is a job subsequent to the first job is being executed in a case that the detection unit detects that the jam occurs in the sheet processing apparatus; and
a setting unit configured to determine whether the recovery job is executed prior to the second job based on a user instruction,
wherein the control unit stops the second job being executed and executes the recovery job in a case that the determination unit determines that the second job is being executed and the setting unit determines that the recovery job is executed prior to the second job, and
the control unit controls a job execution order to execute the recovery job after executing the second job in a case that the determination unit determines that the second job is being executed and the setting unit determines that the recovery job is not executed prior to the second job.

9. The print system according to claim 8, further comprising:
a display unit configured to display a selection screen for allowing a user to select whether to execute the recovery job prior to the second job,
wherein the setting unit determines whether the recovery job is executed prior to the second job based on a user instruction input via the selection screen.

10. The print system according to claim 9,
wherein the display unit displays the selection screen in a case that the detection unit detects that a jam occurs in the sheet processing apparatus.

11. The print system according to claim 8, further comprising:
a storage unit configured to store print data related to the first job,
wherein the control unit executes the recovery job based on the print data stored by the storage unit.

12. A method for controlling a print system including a print apparatus configured to execute print processing and a sheet processing apparatus configured to execute sheet processing of a sheet to which the print processing is executed, the method comprising:
detecting that a jam occurs in the sheet processing apparatus during execution of the sheet processing based on a first job;
executing a recovery job corresponding to the first job in a case that an occurrence of the jam is detected in the sheet processing apparatus;
determining whether a second job which is a job subsequent to the first job is being executed in a case that an occurrence of the jam is detected in the sheet processing apparatus;
determining whether or not the first job and second job are bundled; and
controlling a job execution order to execute the recovery job after executing the second job in a case (1) that the second job is determined as being executed, and (2) the first or second job are bundled.

13. A non-transitory storage medium storing a program for causing a computer to execute a method according to claim 12.

14. A method for controlling a print system including a print apparatus configured to execute print processing and a sheet processing apparatus configured to execute sheet processing of a sheet to which the print processing is executed, the method comprising:
detecting that a jam occurs in the sheet processing apparatus during execution of the sheet processing based on a first job;

executing a recovery job corresponding to the first job in a case that an occurrence of the jam is detected in the sheet processing apparatus;

determining whether a second job which is a job subsequent to the first job is being executed in a case that an occurrence of the jam is detected in the sheet processing apparatus;

determining whether or not the first job and second job are bundled; and stopping the second job being executed and executing the recovery job in a case (1) that the second job is determined as being executed, and (2) the first or second job are bundled.

15. A non-transitory storage medium storing a program for causing a computer to execute a method according to claim 14.

16. A method for controlling a print system including a print apparatus configured to execute print processing and a sheet processing apparatus configured to execute sheet processing of a sheet to which the print processing is executed, the method comprising:

detecting that a jam occurs in the sheet processing apparatus during execution of the sheet processing based on a first job;

executing a recovery job corresponding to the first job in a case that an occurrence of the jam is detected in the sheet processing apparatus;

determining whether a second job which is a job subsequent to the first job is being executed in a case that an occurrence of a jam is detected in the sheet processing apparatus;

determining whether to execute the recovery job prior to the second job based on a user instruction;

stopping the second job being executed and executing the recovery job in a case that the second job is determined as being executed and it is determined that the recovery job is executed prior to the second job;

determining whether or not the first job and second job are bundled; and controlling a job execution order to execute the recovery job the second job in a case (1) that the second job is determined as being executed and it is determined that the recovery job is not executed prior to the second job, and (2) the first or second job are bundled.

17. A non-transitory storage medium storing a program for causing a computer to execute a method according to claim 16.

* * * * *